UNITED STATES PATENT OFFICE.

IENS P. LIHME, OF LAKEWOOD, OHIO, ASSIGNOR TO THE GRASSELLI CHEMICAL COMPANY, OF CLEVELAND, OHIO, A CORPORATION OF OHIO.

METHOD OF MAKING LEAD ARSENATE.

1,302,186.      Specification of Letters Patent.      Patented Apr. 29, 1919.

No Drawing.     Application filed November 7, 1918. Serial No. 261,468.

*To all whom it may concern:*

Be it known that I, IENS P. LIHME, a citizen of the United States, and a resident of Lakewood, county of Cuyahoga, and State of Ohio, have invented a new and useful Improvement in Methods of Making Lead Arsenate, of which the following is a specification, the principle of the invention being herein explained and the best mode in which I have contemplated applying that principle, so as to distinguish it from other inventions.

It is well known that the reaction between litharge, that is, between lead oxid of the formula PbO, and various acids, with which such oxid normally reacts rather slowly, may be quickened by the use of a suitable catalytic agent, as, for example, an acid that readily reacts with said oxid. Thus in the manufacture of white lead (see U. S. Patent No. 59,901, to Fell *et al.*, dated Nov. 20, 1866) lead oxid is converted into the sulfate by adding sulfuric acid to the oxid admixed with a relatively small proportion of nitric acid. The nitrate produced by such nitric acid is readily attacked by the sulfuric acid, instantly forming a portion of sulfate of lead, and the nitric acid thus set free again takes a fresh portion of oxid, and so on, such action and reaction continuing until the whole mass is converted. Instead of nitric acid, acetic acid may be used as the catalytic agent in the process just described. It is also known, in fact should be obvious from the foregoing, that nitric acid or acetic acid may be used as a catalyzing agent in making arsenate of lead from lead oxid and arsenic acid, (see U. S. Patent No. 892,603 to Luther *et al.*, of July 7, 1908), acetic acid being referred to in the patent just named, as the preferred catalyst.

One of the objects sought in the case of lead arsenate is the production of a voluminous, flocculent precipitate which will settle slowly and so be adapted to form a more perfect and uniform mixture with water when such arsenate is used in the form of a spray for insecticidal purposes. In my recent Patent, No. 1,267,428, dated May 28, 1918, I describe a method of making lead arsenate analogous to the foregoing, in which, however, hydrofluosilicic acid ($H_2SiF_6$) is used as the catalytic agent, with admirable results, in that the arsenate thus formed is a soft, flaky white precipitate that is readily suspended in water with little tendency to settle.

I have now found that an even better product, in the way of lead arsenate for the purpose in hand, is obtained when formic acid ($CH_2O_2$) is employed as the intermediary for promoting the reaction between the lead oxid and arsenic acid. The present invention accordingly consists of the steps hereinafter fully described and particularly pointed out in the claims, the following description setting forth in detail one approved method of carrying out the process, such disclosed mode, however, constituting but one of the various ways in which the principle of the invention may be used.

The lead oxid, or litharge, and arsenic acid are preferably used in the proportion of their combining weights, it being understood that such combining weights are slightly different for the different arsenates, viz., the so-called acid arsenate of lead usually consisting of a mixture of the two. Preparatory to the reaction, the litharge is stirred into water so as to make a rather dilute mixture, then a relatively small amount of formic acid is added preferably less than one per cent. of the amount of arsenic acid used as aforesaid, and finally the proper amount of arsenic acid.

Such formic acid presumably reacts with the lead oxid to form a lead formate, which is soluble in water, and which in turn reacts with the arsenic acid present in the mixture to form lead arsenate. Incidentally to this last reaction, formic acid is again set free to react with more lead oxid, and so on until all of the lead oxid is converted into the desired arsenate, the reactions being represented by the following equations:—

(1)   $PbO + 2CH_2O_2 = Pb(CHO_2)_2 + H_2O$.
(2)   $3Pb(CHO_2)_2 + 2H_3AsO_4 =$
            $Pb_3(AsO_4)_2 + 6CH_2O_2$.

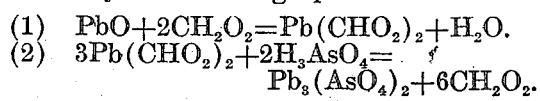

As previously stated, the arsenate is formed as a soft flocculent precipitate, which may be separated from the residual solution in any well known manner to form either a paste, or, upon being dried and disintegrated, a powder. In the latter case the particles do not show the tendency to condense, which is characteristic of lead arsenate when made by most commercial methods of manufacture, but retains the desirable slow-settling quality of the original precipitate. I have also found that the reaction, where formic acid is thus used as the catalytic agent, proceeds with unexpected rapidity and thus makes the process in hand a most satisfactory one from the manufacturing standpoint.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making lead arsenate which consists in reacting between lead oxid and arsenic acid in the presence of formic acid, substantially as described.

2. The method of making lead arsenate which consists in reacting between lead oxid and arsenic acid, used in the proportions of their combined weights, in the presence of formic acid, substantially as described.

3. The method of making lead arsenate which consists in reacting between lead oxid and arsenic acid, used in the proportions of their combined weights, in the presence of formic acid, the latter being used in an amount less than one per cent. of such arsenic acid.

Signed by me, this 28th day of October, 1918.

IENS P. LIHME.